A. R. EBENREITER.
DENTAL BROACH HOLDER.
APPLICATION FILED MAR. 18, 1916.
1,198,628.
Patented Sept. 19, 1916.
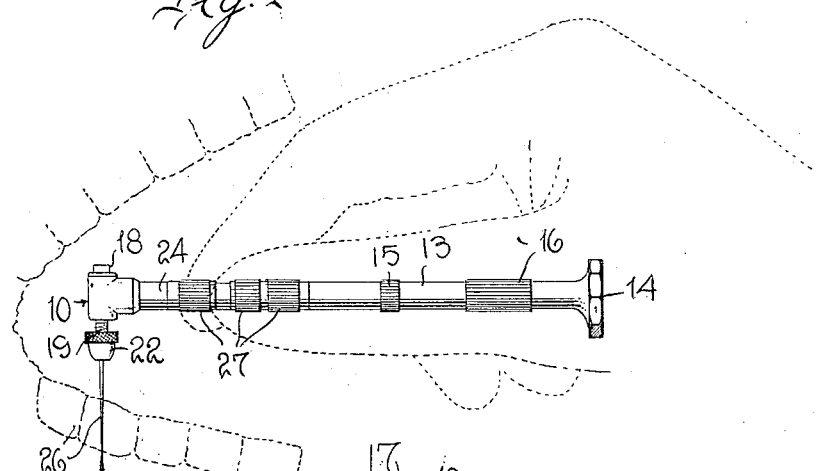
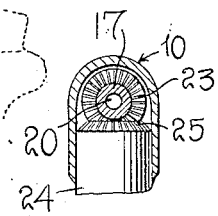
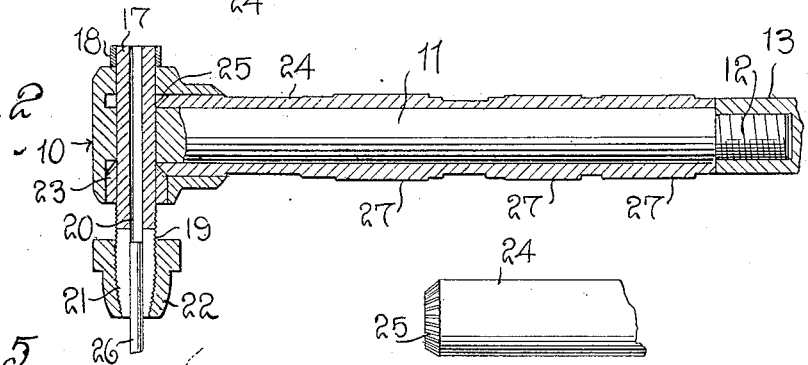
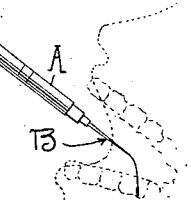
Inventor
ALFRED R. EBENREITER
By Watson E. Coleman
Attorney

UNITED STATES PATENT OFFICE.

ALFRED R. EBENREITER, OF SPOKANE, WASHINGTON.

DENTAL-BROACH HOLDER.

1,198,628.  Specification of Letters Patent.  Patented Sept. 19, 1916.

Application filed March 18, 1916. Serial No. 85,159.

*To all whom it may concern:*

Be it known that I, ALFRED R. EBENREITER, a citizen of the United States, residing at Spokane, in the county of Spokane and State of Washington, have invented certain new and useful Improvements in Dental-Broach Holders, of which the following is a specification, reference being had to the accompanying drawings.

This invention relates to dental instruments, and particularly to broach holders.

It is the general object of this invention to provide a broach holder so constructed that the shank of the holder may be disposed at right angles to the broach.

A further object of the invention is to provide a broach holder in which the broach holding chuck is rotatable by means of a relatively long rotatable sleeve mounted upon the shank of the holder, the sleeve being relatively long and disposed adjacent the chuck so that the operator may readily manipulate the sleeve between his thumb and finger.

Still another object is to provide a broach holder in which the parts may be readily detached so that the holder may be cleansed.

Other objects will appear in the course of the following description.

My invention is illustrated in the accompanying drawings, wherein:

Figure 1 is an elevation of my improved broach holder showing it in its practical application; Fig. 2 is an enlarged longitudinal section of a portion of the broach; Fig. 3 is a fragmentary horizontal section on a line just above the sleeve 24; Fig. 4 is an elevation of the sleeve 24; and Fig. 5 is a perspective view showing the usual and ordinary dental broach in use.

Referring to Fig. 2, which shows the broach holder in section, it will be seen that the holder comprises a hollow elbow 10 or head which is mounted upon a longitudinally extending shank 11 reduced and screw threaded at its end, as at 12, and adapted to have screw threaded engagement with a shank section 13 having a greater diameter than the shank section 11 and formed at its extremity with the many-sided head 14. The shank section 13 is provided at two or more points with knurled or ridged surfaces 15 and 16, the latter being longer than the knurled surface 15.

Disposed within the head 10 and extending through it at right angles to the shank 11 is a tubular shaft 17 which is headed at its upper end, as at 18, and which projects through the opposite end of the head 10 and is provided with screw threads 19 on this projecting portion of the shaft. This projecting portion is bored at its center, as at 20, and slit as at 21 so as to form a plurality of jaws adapted to close upon the broach. These jaws are closed upon the broach by means of a collar or sleeve 22 which has a tapered interior, screw threaded to engage with the tapered screw threaded end of the shaft 17. Formed upon the shaft 17 is a gear face 23, and rotatably mounted upon the shank 11 is a sleeve 24 whose extremity is formed with beveled gear teeth 25. This tubular sleeve or shaft, as it may be termed, abuts at one end, when in place, against the shank section 13 and is held thereby into proper meshing engagement with the teeth on the gear face 23. Of course this gear face 23 is relatively small. The broach is designated 26 and may be of any suitable or usual character, the particular form of the broach not having anything to do with the present invention.

In Fig. 5, I show the manner in which an ordinary broach holder, designated A, is inserted into the patient's mouth, and showing the broach B as being bent by such insertion. With the ordinary broach holder the operator controls the action of the broach by a slow rotary movement of the holder between his thumb and first finger, and the operation of the device is governed by the sense of touch. This control and sense of touch in my invention is secured by the manipulation of the revolving sleeve 24 which is supplied with three ridged or knurled surfaces 27, two of these surfaces being placed relatively close together, and these surfaces are intended to furnish a perfect grip to the thumb and finger.

It is to be noted that the tubular shaft 17 is tubular throughout its length so that the broach may be readily adjusted into this tubular shaft and thus the length of the projecting portion of the broach may be readily controlled. Furthermore, it is to be observed that in my construction the broach is rotated by means of a relatively long sleeve 24 which is rotatably mounted upon the shank 11 and that this construction permits the operator to readily grasp the sleeve and operate it in the manner illustrated in Fig. 1 and without regard to whether the operator's fingers are short or long which permits the operator to rotate the broach by gripping the sleeve between his fingers adjacent the head 10 and thus secure an absolute steadiness for the broach which is not possible where the broach is rotated by a member disposed some distance from the broach proper.

It will of course be seen that the shaft 17, split at one end and provided with the collar, 22 constitutes a chuck in which the broach is mounted and that this broach is rotatably mounted in the head of the shank and driven by means of the rotatable sleeve 24.

While I have illustrated a detailed construction which I have found to be very effective in practice, I wish it understood that I need not be limited to all of these details as it is obvious that many minor changes might be made.

Having described the invention, what I claim is:

1. A broach holder having a shank, a rotatable broach holding chuck operatively mounted at one end of the shank and having its axis disposed at right angles to the axis of the shank, a gear face formed on the chuck, and a sleeve rotatably mounted upon the shank and forming part thereof having gear teeth at one end engaging the gear face on the chuck.

2. A broach holder comprising a hollow head having a laterally extending branch forming an elbow, a shaft mounted in said head at right angles to the branch, the shaft projecting through the head and being split to form chuck jaws, a collar having screw-threaded engagement with the projecting portion of the shaft to close said jaws, a shank section operatively connected to the head and extending at right angles to the shank and smaller in diameter than said elbow, the extremities of the shank being screw threaded, a shank section having screw threaded engagement with the end of the first-named shank section, and a rotatable operating sleeve surrounding the first-named shank section, extending into the opening of the elbow and having gear teeth on its extremity adapted to engage gear teeth on the shaft, said sleeve being held in place by engagement with the end of the second-named shank section.

In testimony whereof I hereunto affix my signature in the presence of two witnesses.

ALFRED R. EBENREITER.

Witnesses:
 JNO. L. DIRKS,
 J. M. SIMPSON.

Copies of this patent may be obtained for five cents each, by addressing the "Commissioner of Patents, Washington, D. C."